Patented July 4, 1950

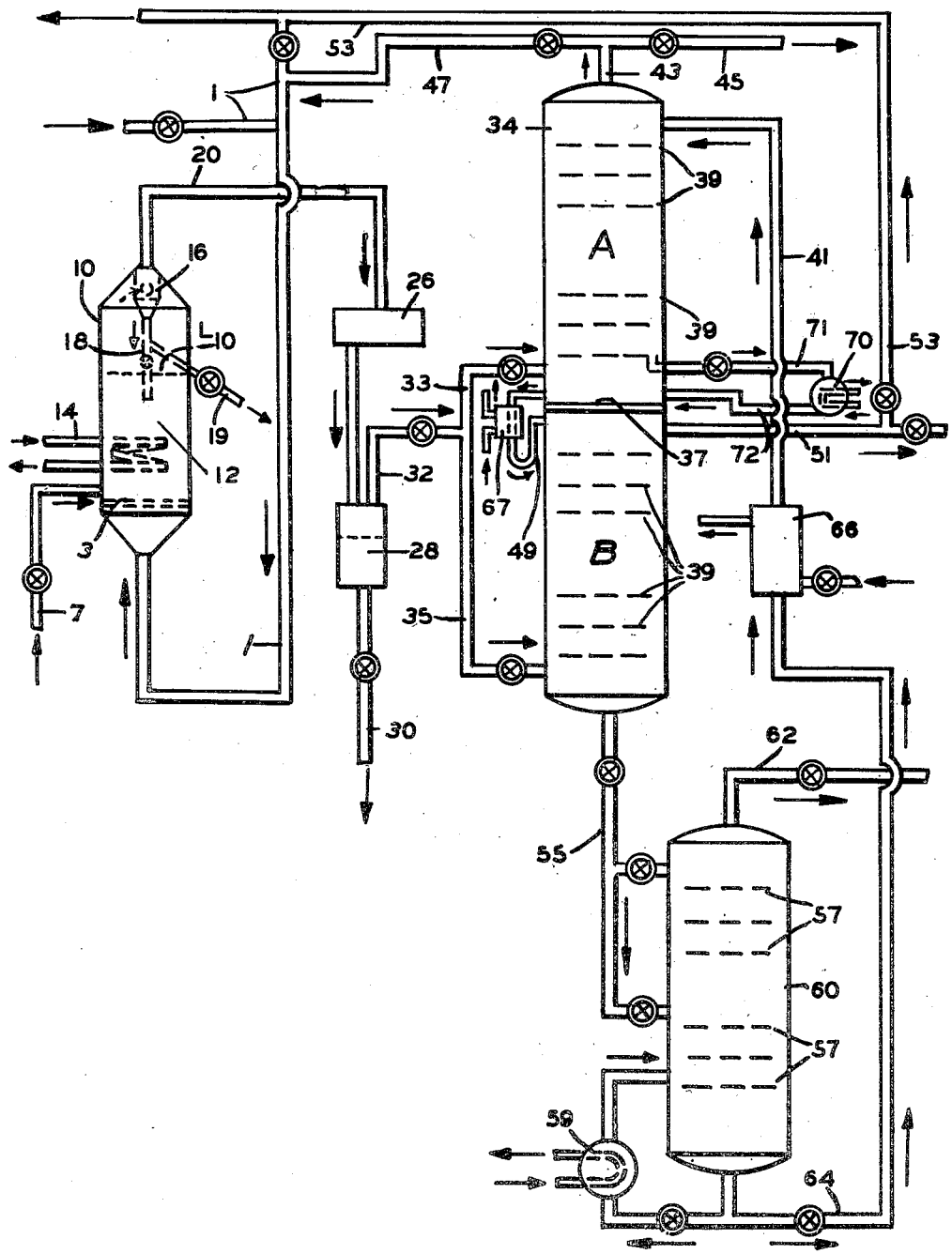

2,514,340

UNITED STATES PATENT OFFICE 2,514,340

PRODUCTION OF GASES RICH IN HYDROGEN

Walter H. Rupp, Mountainside, N. J., assignor to Standard Oil Development Company, a corporation of Delaware Application December 22, 1948, Serial No. 66,613

10 Claims. (Cl. 260—450)

The present invention relates to the production of gases rich in hydrogen and, more particularly, to the production of such gases from tail gases obtained in the catalytic synthesis of normally liquid hydrocarbons and oxygenated compounds from carbon monoxide and hydrogen.

The catalytic synthesis of hydrocarbon oils from carbon monoxide and hydrogen has been assuming increasing importance in recent years as a liquid fuel source supplementing and potentially replacing the steadily decreasing crude oil resources. The hydrocarbon synthesis may be operated on the basis of using either natural gas or carbonaceous solids such as coal, etc. for the production of synthesis gas containing carbon monoxide and hydrogen. These processes have not as yet advanced to a state of development at which synthetic oils would be economically competitive with natural mineral oils.

This situation has stimulated considerable research activity aiming at the improvement of the process as well as product yields and quality. Previous attempts in this direction have been concentrated largely on the valuable liquid or readily liquefiable synthesis products such as fuels for internal combustion engines, lubricants and various oxygenated compounds.

However, the hydrocarbon synthesis yields substantial amounts of a further by-product in the form of tail gas from which normally liquid synthesis products have been removed by cooling and which is rich in hydrogen, carbon monoxide and hydrocarbon gases. This tail gas which normally amounts to about 5,000–10,000 cu. ft. per bbl. of liquid products formed has the great advantage of being substantially sulphur-free but has been of little commercial value heretofore as a result of its low B. t. u. value.

The heating value is low because of the presence of carbon dioxide, carbon monoxide, hydrogen and substantial amounts of nitrogen, the latter introduced by the coal or natural gas used as starting material for the synthesis gas and/or by air employed in the synthesis gas manufacture. In addition, particularly when iron catalysts are used for the production of high octane motor fuels and oxygenated compounds, the tail gas contains appreciable proportions of unsaturated hydrocarbon gases.

Even after conventional oil scrubbing, the carbon dioxide and nitrogen contents of the tail gas are normally too high and its CO content too low to permit its further use in secondary synthesis reactors without some additional high temperature conversion into a gas of proper composition. The high $CO_2$ content also renders the gas undesirable for other hydrogenation or reduction reactions. Even as a recycle gas to the synthesis stage in which it is produced the tail gas is not of universal utility because in most cases, particularly in the iron-catalyzed fluid-type synthesis operation, a high $H_2$ partial pressure should be maintained in the reaction zone to avoid carbon formation and catalyst disintegration. For this purpose, a recycle gas of increased hydrogen content is obviously more desirable.

From the foregoing it is apparent that synthesis tail gas though produced in large amounts contributes little to the total value of products recoverable from hydrocarbon synthesis. Any increase in the value of tail gas will therefore amount to a considerable improvement of the economics of the synthesis process. The present invention is chiefly concerned with an improvement of this type.

It is, therefore, the principal object of the present invention to improve the economy of the catalytic synthesis of hydrocarbons from CO and $H_2$ by increasing the value of the synthesis tail gas.

A more specific object of the present invention is to increase the hydrogen content of synthesis tail gas by an inexpensive procedure so as greatly to improve the utility of the tail gas.

Other and more specific objects and advantages will appear hereinafter.

In accordance with the present invention, tail gas produced in the catalytic synthesis of hydrocarbons from CO and $H_2$, by cooling the total synthesis product below the condensation temperature of water and separating uncondensed gas from condensed materials, is subjected to oil scrubbing in such a manner that most of its $CO_2$ content, substantial proportions of its hydrocarbon content but practically no hydrogen are removed whereby its hydrogen content is correspondingly increased. Oil scrubbing of synthesis tail gas is well known in the art and has been widely practiced in order to recover substantial proportions of such valuable hydrocarbons as remain uncondensed in the cooling stage. However, these conventional absorption systems involve absorption conditions conducive to the predominant absorption of hydrocarbon constituents, particularly those having three or more carbon atoms per molecule while other constituents, particularly $CO_2$, are little or not at all affected.

It has now been found that the conventional oil scrubbing process may be so modified that at least a major proportion of the $CO_2$ content is removed together with hydrocarbons without significant hydrogen absorption and without any additional expense in the form of materials, equipment or operating cost. This is accomplished in accordance with the invention by separating the total tail gas stream into a minor portion, preferably amounting to about 10-30% of the total tail gas stream, and a major portion, scrubbing the minor portion in a first absorption stage with the total lean absorbent oil stream required for an efficient removal from the total tail gas stream of the hydrocarbons having three or more carbon atoms per molecule, and then scrubbing the major portion of the tail gas stream in a second absorption stage with the rich oil from the first absorption stage in a conventional manner. These two absorption stages may be readily carried out in different sections of a single conventional absorption tower. The total lean absorbent oil requirement referred to above amounts to about 40-200 gallons per 1000 cu. ft. of total tail gas to be treated, depending on the efficiency of the scrubbing equipment used.

When so operating, the first scrubbing stage yields a tail gas stream which, as the result of the favorable ratio of gas to scrubbing oil, is deprived of most of its $CO_2$ content and substantially all its hydrocarbons containing more than three carbon atoms per molecule while the hydrogen content is substantially unchanged because of the insignificant solubility of hydrogen in the oil absorbent. Thus, the hydrogen concentration of the minor tail gas stream after treating may be increased by about 100% with a simultaneous decrease of the $CO_2$ and hydrocarbon concentrations by about 40-60% to yield a gas having a ratio of $H_2/CO_2+CO$ of about 7/1 or even higher. A gas of this type may be used without further purification or conversion for many hydrogenation processes and for the upward adjustment of the hydrogen partial pressure in the hydrocarbon synthesis itself.

The gas recovered from the second scrubbing stage is a scrubbed tail gas of conventional composition. It may be used as a fuel or in certain cases as a recycle gas, if desired after $CO_2$ removal by conventional methods. The extracted hydrocarbons are stripped from the rich oil recovered from the second stage and may be further processed in polymerization, alkylation, isomerization, treating and/or other refining operations to increase the yield of synthetic gasoline.

The first scrubbing stage of the invention is preferably operated at elevated pressures of about 100-500 lbs. per sq. in. which may be the same as or closely approaching that employed in the synthesis process itself. The absorption oil temperature may be about 50° to 150° F., depending on the pressure used. Absorption oil to gas ratios of about 100 to 1000 gallons of absorption oil per 1000 cu. ft. of gas to be treated in the first scrubbing stage are usually adequate for this stage of the process. The second scrubbing stage may be operated at conventional conditions which may include elevated pressures of about 100-500 lbs. per sq. in. as in the first stage, with an absorption oil temperature of 50° to 150° F. The ratio of enriched absorption oil from the first stage to tail gas fed to the second stage may be 50 to 220 gallons per 1000 cu. ft. of tail gas.

Any liquid absorbent having a strong absorption power for hydrocarbons and $CO_2$ may be used for the purposes of the invention. Hydrocarbon oils boiling within the approximate range of 150°-500° F., are preferred, particularly suitable fractions of the synthetic oil produced in the hydrocarbon synthesis itself. A narrower boiling or lighter cut such as 150°-250° F. absorbent oil can also be used.

Having set forth its objects and general nature, the invention will be best understood from the following more detailed description wherein reference will be made to the accompanying drawing, the single figure of which illustrates semi-diagrammatically a system adapted to carry out a preferred embodiment of the invention.

Referring now to the drawing, fresh synthesis feed gas which may have a ratio of $H_2:CO$ of 0.7-3 to 1 and which may be produced in any conventional synthesis gas generation sysem (not shown) from hydrocarbon gases or carbonaceous solids is supplied through line 1 at the pressure of the synthesis which may range between about 100-1000 lbs. per sq. in., to the lower portion of synthesis reactor 10 which it enters through a perforated distributing plate 3. The synthesis gas entering reactor 10 is contacted with a mass 12 of finely divided conventional iron-type synthesis catalyst, such as reduced sintered pyrites ash or red iron oxide, reduced fused magnetite containing small amounts of alumina, reduced mill scale, iron carbide-containing iron, etc., all promoted with about 0.5-5% of an alkali metal compound, such as the oxides, carbonates, or halides of sodium or potassium. The catalyst should have a particle size of about 20-200 microns, mostly about 50-100 microns. The superficial linear velocity of the gases and product vapors flowing upwardly through reactor 10 is so controlled that mass 12 takes on the appearance of a boiling liquid having a well defined upper level $L_{10}$ and an apparent density of about 50-150 lbs. per cu. ft. Linear velocities of about 0.3-3 ft. per second are suitable for this purpose. As a result of the highly turbulent condition of fluidized mass 12 the distribution of the catalyst particles and the reacting gases, as well as the temperature, are substantially uniform throughout the mass. The heat liberated by the exothermic synthesis reaction may be withdrawn by conventional means such as cooling coil 14 to establish a constant reaction temperature of, say, about 550°-800° F.

The gasiform product of the synthesis reaction is withdrawn overhead from level $L_{10}$ and may be passed through a conventional gas-solids separator such as cyclone 16. Separated catalyst fines may be either returned to mass 12 through dippipe 18 or discarded through line 19. Fresh or regenerated make-up catalyst may be added periodically or continuously through line 7 in any suitable manner.

The total gasiform reaction effluent now substantially free of entrained catalyst fines leaves reactor 10 through line 20 and enters a cooler-condenser 26 wherein it is cooled to a temperature below the condensation temperature of water at the pressure involved. The major portion of the normally liquid reaction products including hydrocarbons, oxygenated compounds and water are condensed in condenser 26. Gas and condensate then flow to a gas-liquid separator 28 from which liquid products are withdrawn through line 30 and passed to any desired further treatment for the recovery of synthetic oils and oxygenated compounds in a manner known per se (not shown).

Wet synthesis tail gas is withdrawn from separator 28 through line 32 to be further treated as will be presently described. The gas in line 32 may have a temperature of about 50°–150° F. and may still be substantially under preferred synthesis pressure of, say, about 250–500 lbs. per sq. in. The composition of the tail gas depends on the conditions maintained in reactor 10, chiefly on the composition of the feed gas, the type of catalyst used and the reaction temperature. A typical tail gas composition is given below.

| Component: | Mol per cent |
|---|---|
| $H_2$ | 28.1 |
| CO | 2.9 |
| $CO_2$ | 27.0 |
| $N_2$ | 17.2 |
| $H_2O$ | Traces |
| $C_1+C_5+$ hydrocarbons | 24.8 |
| | 100.0 |

A tail gas of this composition was obtained, for example, under the following conditions. Synthesis gas was generated at 2480° F., 450 lbs. per sq. in. using natural gas containing 7.5% nitrogen. $H_2/CO$ ratio in synthesis gas was 1.79/1. Reactor conditions were 650° F., 400 lbs. per sq. in. outlet, with 1.15 ft. per sec. outlet gas velocity. Catalyst density (iron type) was 80 lbs. per cu. ft. CO conversion was 98%; $H_2$ conversion 88%. The nitrogen content shown is high but does not affect the reaction in any major manner.

The total tail gas in line 32 is split into two portions, a minor portion of, say, about 20–25% being passed through line 33 to an upper section A and the remainder through line 35 to a lower section B of a scrubbing tower 34. These two tail gas streams are treated in tower 34 at a pressure of 250 to 500 lbs. per sq. in. as follows.

Sections A and B are separated by a blank plate 37 dividing tower 34 in two absorption sections of approximately equal height. Tower 34 is provided in a manner known per se with a suitable number of horizontal bubble caps or perforated plates 39 totaling about 10–40 in each section to improve the gas-liquid contact in the scrubbing tower. The total lean oil absorbent required for scrubbing the total tail gas to the desired degree, for example a kerosene cut of the synthetic oil, is supplied at a temperature of about 50°–100° F. from line 41 to the top of section A and flows therein downwardly over bubble plates 39 countercurrently to tail gas entering section A through line 33 at approximately the same temperature. The supply of oil absorbent to section A is controlled at a rate of about 200–500 gallons per 1000 cu. ft. of total tail gas to be treated in section A.

At these conditions and assuming a total untreated tail gas of the composition indicated above, the treated tail gas withdrawn overhead from section A through line 43 may have a composition about as follows:

| Component: | Mol per cent |
|---|---|
| $H_2$ | 50.5 |
| CO | 1.3 |
| $CO_2$ | 6.0 |
| $N_2$ | 31.2 |
| $H_2O$ | Traces |
| $C_1$–$C_2$ hydrocarbons | 11.0 |
| | 100.0 |

This gas though diluted with nitrogen has a $CO_2$ content low enough to permit its supply through line 45 to any desired use in hydrogenation reactions or its recycle in any desired proportion through line 47 to line 1 and reactor 10 to modify the synthesis conditions. If the natural gas fed to the generation section does not contain appreciable nitrogen content, the nitrogen content of the scrubbed gas from section A will be proportionately lower.

Oil absorbent enriched with hydrocarbons, $CO_2$ and an insignificant amount of $H_2$ and CO flows continuously from a lower portion of section A through a syphoned connecting line 49 to the top of section B wherein it is passed countercurrently to the main tail gas stream supplied through line 35, substantially as described in connection with section A. Enriched oil flowing through line 49 from section A may be cooled in exchanger 67 to 50°–100° F. temperature followed by introducing the cooled oil to the top of section B operating at 250–500 lbs. per sq. in. A ratio of enriched oil to untreated tail gas of 60–150 gallons per 1000 cu. ft. is used in section B.

The treated major tail gas stream is withdrawn from the top of section B through line 51 and either used for fuel purposes or recycled in any desired proportion through line 53 to line 1 and reactor 10. At the conditions specified, this main tail gas stream may have a composition about as follows:

| Component: | Mol per cent |
|---|---|
| $H_2$ | 29.7 |
| CO | 3.1 |
| $CO_2$ | 28.4 |
| $N_2$ | 18.1 |
| $H_2O$ | Traces |
| $C_1$–$C_3$ hydrocarbons | 20.7 |
| | 100.0 |

The composition of this tail gas stream is affected by the circumstance that some lighter components such as methane, ethane and propane fractions absorbed in section A are desorbed in section B as the oil descends therein.

Rich oil absorbent leaves the bottom of section B through line 55 and is passed to a conventional stripper or absorbent regenerator 60 provided with bubble plates 57, which may number about 10 to 40 and a heating device, such as reboiler 59 at the bottom of the stripper. Stripper 60 may be operated at the same or a lower pressure than that maintained in tower 34 and at a temperature adequate to drive off substantially the total $C_1$–$C_6$ hydrocarbon content of the tail gas. Temperatures of about 400°–600° F. are adequate for this purpose at stripper pressures of about 50 to 300 lbs. per sq. in. Hydrocarbons, $CO_2$ and $H_2$ liberated in stripper 60 are withdrawn overhead through line 62 to be passed to any desired further refining and recovery equipment.

Lean oil absorbent is withdrawn from the bottom of stripper 60 and passed through lines 64 and 41 to the top of section A of tower 34 as described above to repeat the cycle. A cooler 66 is arranged on line 41 to adjust the temperature of the lean oil to that desired for the scrubbing treatment in tower 34.

The system illustrated by the drawing permits of various modifications. Fixed bed, rather than fluid operation, may be employed in the synthesis stage and cobalt-type, rather than iron-type, synthesis catalysts may be used, as will be readily understood by those skilled in the art of hydrocarbon synthesis. If desired, reboiling may be provided in upper section A of tower 34 in a manner known per se in order to increase the selectivity of the process toward an increased purity of the $H_2$ recovered from section A. A suitable reboiling arrangement is schematically indicated in the drawing. Oil is withdrawn from a pan in tower 34, passed by line 71 through reboiler 70 where the temperature is raised to 200°–300° F., thereby driving off hydrogen and any light gases desired for inclusion in the scrubbed gas leaving through line 43. The heated oil is returned to tower 34 through line 72. Other modifications may appear to those skilled in the art without departing from the spirit of the invention.

The foregoing description and exemplary operations have served to illustrate specific applications and results of the invention but are not intended to be limiting in scope.

What is claimed is:

1. A process of increasing the value of synthesis tail gas obtained by reacting CO with $H_2$ in a synthesis zone in the presence of a synthesis catalyst at synthesis conditions and removing normally liquid constituents from the total synthesis product, which comprises dividing the total amount of said tail gas into a minor stream and a major stream, contacting said minor stream in a first contacting zone with a liquid absorbent for hydrocarbons and carbon oxides, in an amount at least sufficient to absorb a major proportion of hydrocarbons and carbon oxides present in said total tail gas, and at conditions conducive to the absorption of a major proportion of hydrocarbons and carbon oxides and insignificant proportions of hydrogen contained in said minor stream, withdrawing a minor tail gas stream of increased value from said first contacting zone, withdrawing liquid absorbent enriched with hydrocarbons and carbon oxides from said first contacting zone, contacting said major stream with said withdrawn absorbent in a second contacting zone at conditions conducive to the absorption of at least a major proportion of hydrocarbons contained in said major stream, withdrawing a major tail gas stream from said second zone and withdrawing rich liquid absorbent from said second zone.

2. The process of claim 1 in which said minor stream is about 10–30% of said total tail gas.

3. The process of claim 1 in which said conditions in said first contacting zone comprise temperatures of about 50°–150° F. and pressures of about 100–500 lbs. per sq. in.

4. The process of claim 1 in which said amount of absorbent is about 40 to 200 gallons per 1000 cu. ft. of total tail gas to the absorber.

5. The process of claim 1 in which at least a portion of said minor stream withdrawn from said first contacting zone is recycled to said synthesis zone.

6. The process of claim 1 in which said withdrawn rich absorbent is stripped of hydrocarbons and carbon oxides in a separate stripping zone and stripped absorbent is returned to said first contacting zone.

7. The process of claim 1 in which the liquid absorbent in said first contacting zone is reboiled.

8. The process of claim 1 in which said absorbent is a hydrocarbon oil.

9. The process of claim 8 in which said oil is a 150°–500° F. cut recovered from said liquid constituents.

10. In the process of producing synthesis tail gas by reacting CO with $H_2$ in a synthesis zone in the presence of a synthesis catalyst at synthesis conditions, removing normally liquid constituents from the total synthesis product leaving a tail gas and scrubbing said tail gas with an absorbent for hydrocarbons, the improvement of increasing the value of said tail gas, which comprises dividing the total amount of said tail gas into a minor stream and a major stream, contacting said minor stream in a first contacting zone with a liquid absorbent for hydrocarbons and carbon oxides, in an amount at least sufficient to absorb a major proportion of hydrocarbons and carbon oxides present in said total tail gas, and at conditions conducive to the absorption of a major proportion of hydrocarbons and carbon oxides and insignificant proportions of hydrogen contained in said minor stream, withdrawing a minor tail gas stream of increased value from said first contacting zone, withdrawing liquid absorbent enriched with hydrocarbons and carbon oxides from said first contacting zone, contacting said major stream with said withdrawn absorbent in a second contacting zone at conditions conducive to the absorption of at least a major proportion of hydrocarbons contained in said major stream, withdrawing a major tail gas stream from said second zone and withdrawing rich liquid absorbent from said second zone.

WALTER H. RUPP.

REFERENCES CITED

The following references are of record in the file of this patent:

UNITED STATES PATENTS

| Number | Name | Date |
|---|---|---|
| 2,455,419 | Johnson | Dec. 7, 1948 |
| 2,463,875 | Hibshman | Mar. 8, 1949 |